United States Patent

[11] 3,598,210

| [72] | Inventor | William H. Barr<br>51 Liberty Pole Road, Hingham, Mass. 02043 |
|---|---|---|
| [21] | Appl. No. | 805,550 |
| [22] | Filed | Mar. 10, 1969 |
| [45] | Patented | Aug. 10, 1971 |

[54] CLUTCH COMPRISING A HELICAL SPRING ACTUATOR
14 Claims, 10 Drawing Figs.

[52] U.S. Cl. ................................................. 192/38,
192/72, 192/81, 192/89
[51] Int. Cl. ......................................................F16d 13/12,
F16d 13/20
[50] Field of Search .......................................... 192/37, 38,
72, 73, 79, 81, 89

[56] References Cited
UNITED STATES PATENTS
| 613,766 | 11/1898 | Hodgkinson | 192/81 (X) |
| 863,639 | 8/1907 | Powell | 192/81 |
| 1,551,670 | 9/1925 | Karge et al | 192/37 |
| 3,129,798 | 4/1964 | Rabinow | 192/79 (X) |

*Primary Examiner*—Allan D. Herrmann

ABSTRACT: A friction clutch or brake having a cylindrical drum within a close fitting tubular collet, a set of rollers surrounding the collet, a helical spring circumscribing the rollers and means for circumferentially tightening the spring. When the spring is tightened it acts radially on the rollers which in turn compress the collet into frictional engagement with the drum, thereby transmitting torque between the collet and the drum. The transmitted torque will gradually increase as the rollers rotate after the spring is tightened, permitting clutching of heavy inertia loads without heavy torsional impact. Various functional and structural modifications employing this principle are also disclosed.

INVENTOR.
William H. Barr

INVENTOR.
William H. Barr

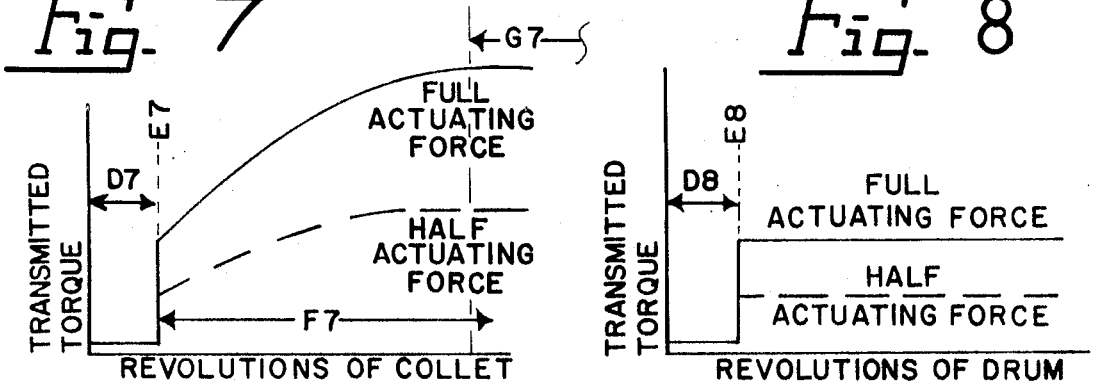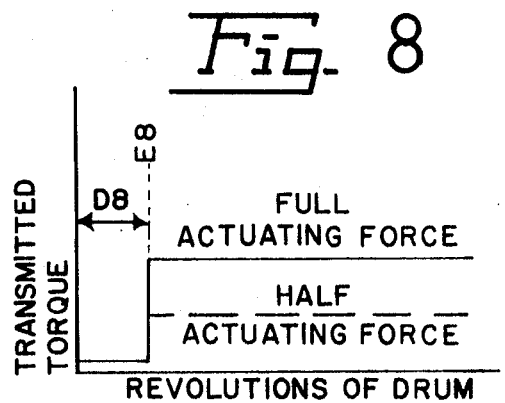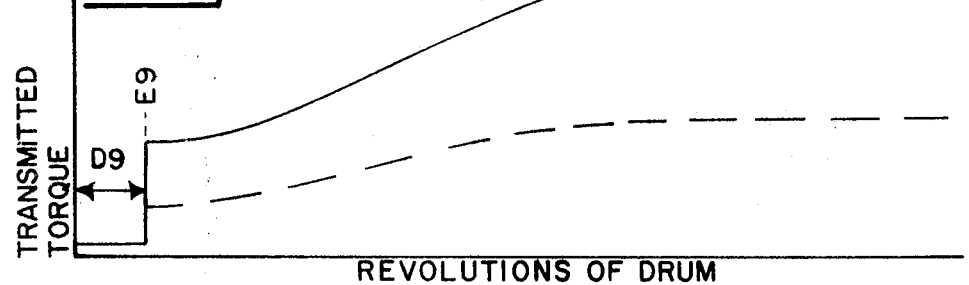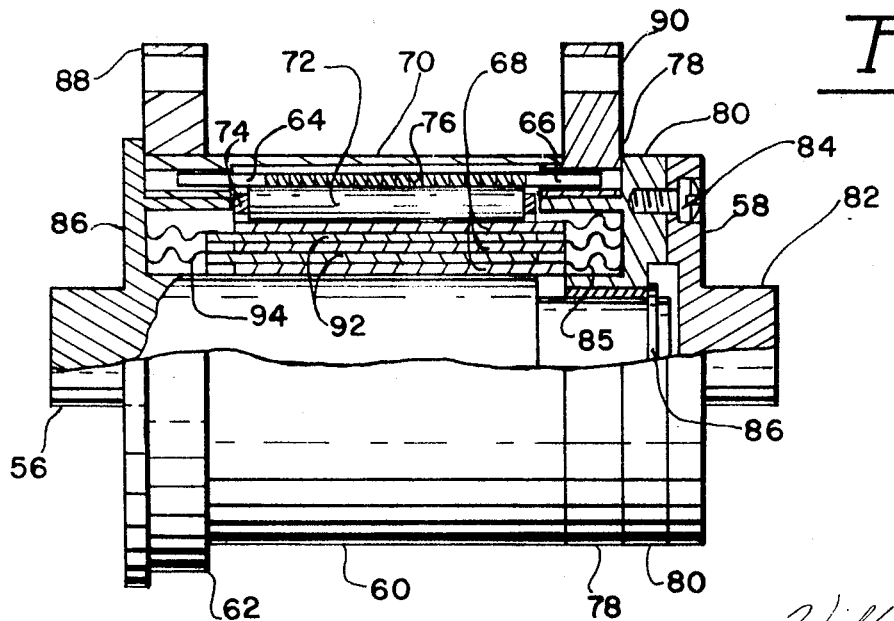

CLUTCH COMPRISING A HELICAL SPRING ACTUATOR

In recent years the engageable wrapped spring clutch has come into favor in many types of machine and other drives. One limitation of this type clutch is its sensitivity to inertia loading and high speed because of its instantaneous action, resulting in high stresses in the wrapped spring. Its use is further limited because the torque is transmitted through the wrapped spring itself and the strength of the spring, therefore, limits the maximum torque that can be transmitted. The application of engageable wrapped spring clutches is therefore limited to relatively low speed and low inertia applications. Because of these speed limitations they often cannot be applied to high-speed, low-torque drives but must instead operate on a geared down low speed, high-torque portion of the drive train. Since the size and cost of the clutches generally increases with the torque requirements, this results in using a much larger and more expensive clutch to accomplish the function.

The present invention, in one embodiment, is comprised of a driven inner cylindrical drum surrounded by and frictionally engageable with a driving tubular collet. A set of rollers is positioned between the outside diameter of the collet and the inside diameter of a helical spring disposed about the rollers. Rotating one end of the helical spring with respect to its other end in the proper direction causes its major diameter to decrease and act radially on the rollers, which transmit an inward, radial force to the collet causing it to frictionally engage the inner cylindrical member.

The helical spring, rollers and collet may be considered as being analogous to the outer race, rollers and inner race of a roller bearing assembly. The collet may therefore rotate with minimum friction with respect to the helical spring.

If the helical spring has a considerable number of turns, the rollers stationary and one end of the helical spring is arcuately urged in a tightening direction with respect to the other end, the first few turns will be in tension to create a radial force on the rollers. The friction between the helical spring and the rollers will act to prevent tightening of the remaining coils. If the collet is now rotated with respect to the helical spring, the rollers will rotate between them and the tension on the helical spring will gradually distribute to all turns as a result of incremental flexing and sliding of the helical spring over the rollers. Therefore, when a sudden actuating torque is applied to the helical spring, as would be the case when a solenoid is used for actuation, the coupling torque between drum and collet gradually increases as the collet rotates. This gradual engagement permits clutch operation under high speed and high inertia loading conditions. The maximum torque capabilities of the present invention are high, being generally limited by the torsional strength of the collet rather than the tensile strength of a helical spring.

An object of my invention is to provide a clutch of small size, high torque capacity and low cost.

Another object is to provide a clutch operable with high-inertia loads.

It is another object to provide a clutch that will smoothly engage with minimum torsional impact when the actuating mechanism is instantaneous in its action.

It is another object to provide a clutch that will slip under extreme overload conditions without damaging or destroying itself.

An additional object is to provide a clutch mechanism that may be actuated by simple and inexpensive controls.

The foregoing and other objects and advantages of this invention will appear from the description to follow. It is obvious that this clutch may be applied equally well as a brake by simply locking the output shaft to prevent it from rotating.

In the drawings:

FIG. 7 is a chart of transmitted torque versus revolutions of the collet.

FIG. 8 is a chart of transmitted torque versus revolutions of the drum, the collet not rotating.

FIG. 9 is a chart of transmitted torque versus revolutions of the drum with the collet starting at zero speed and then rotating at increasing speed.

FIG. 10 is a side partial cross section view of a second form of the clutch having multiple friction surfaces.

Figure 1:
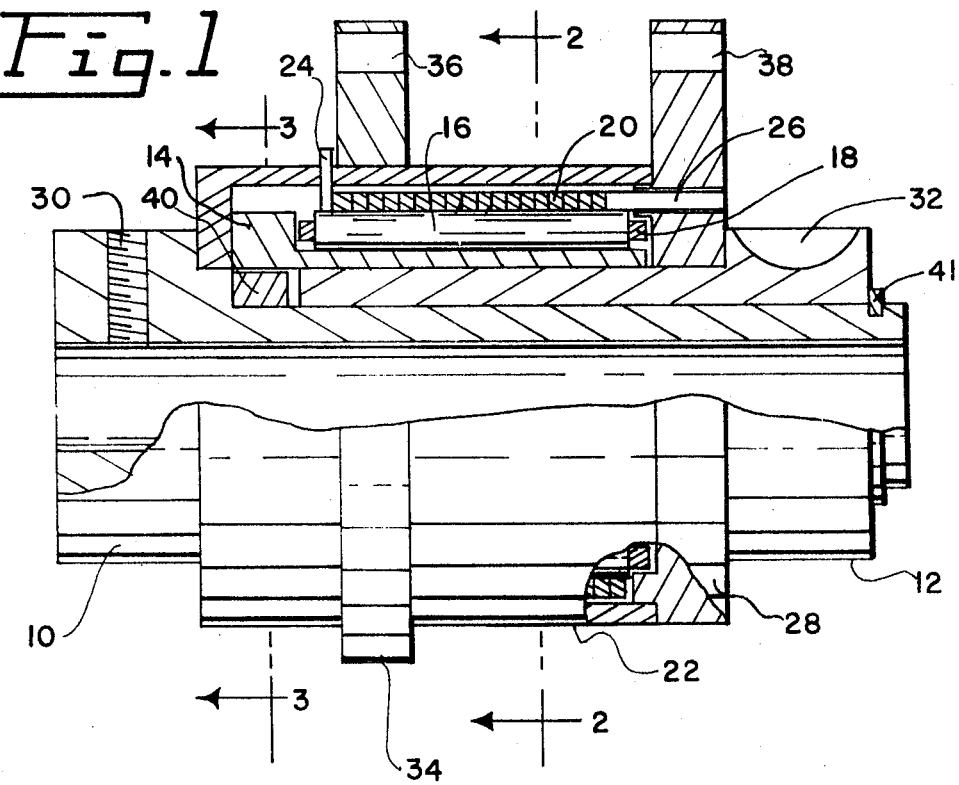
FIG. 1 is a side partial section view through the centerline of the preferred embodiment of my clutch.
Figure 2:
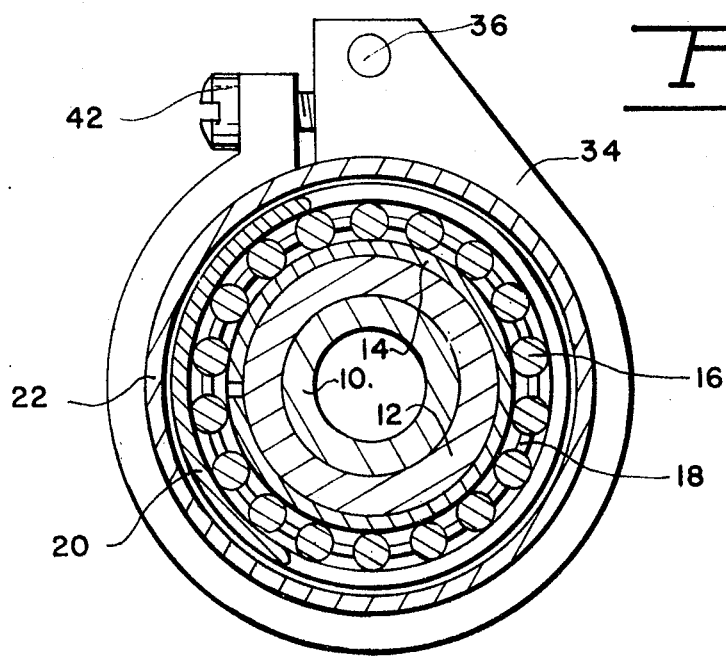
FIG. 2 is a cross section end view of FIG. 1.

Referring now to FIGS. 1 and 2, drum 12 is rotatably mounted on arbor 10, collet 14 is rotatably mounted on drum 12 having a close sliding fit with the mating diameter of the drum. Rollers 16 surround collet 14 and are retained by retainer cage 18. Helical spring 20 surrounds the major diameter of rollers 16. One end of the helical spring is secured against rotation with respect to rotatably mounted housing 22 by means of bent end 24. The other end of the helical spring is connected by means of bent end 26 to the rotatably mounted actuating lever 28. Adjustable clamp 34 solidly grasps housing 22 by means of clamping screw 42. The assembly is axially retained by snap ring 41 in a groove in the drum. Setscrew 30 secures arbor 10 to a drive shaft (not shown) and key way 32 secures drum 12 to an output pulley or shaft (also not shown).

Figure 3:
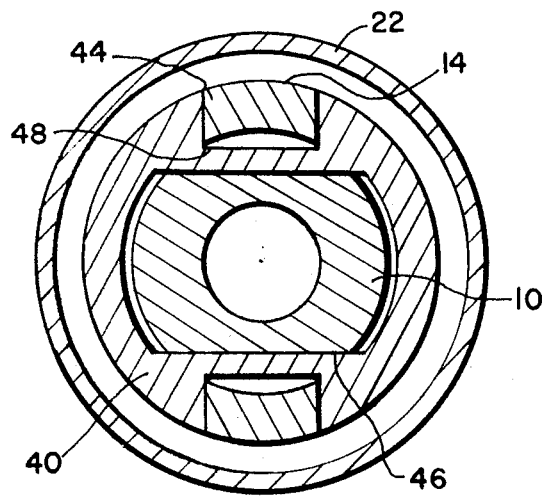
FIG. 3 is another cross section of FIG. 1.

Referring now to FIGS. 3, coupling member 40 acts as the center portion of an oldham coupling connecting collet 14 with arbor 10. Lugs 44 on the collet slidably engage slots 48 in the coupling member and flats 46 in arbor 10 slidably engage mating internal flats in the coupling member.

Figure 4:
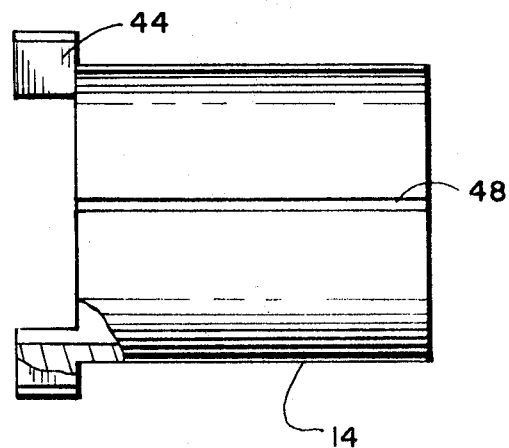
FIG. 4 is a side view of one form of collet 14.

Referring now to FIG. 4, slit 48 is cut in one side of the collet to permit radial flexing.

When the clutch is used in a first mode of operation, clamp 34 is secured against rotation by a fixed pin or other means engaging hole 36 and an actuator such as a solenoid is linked to hole 38 in actuating lever 28 so that actuating the solenoid rotates the actuator in a direction to tighten the spring on the rollers. Arbor 10 is secured to a drive shaft and drum 12 to the driven load. Arbor 10 and collet 14 will be driven in a direction to unwind the actuator end of the helical spring.

FIG. 7 is a graph of typical coupling characteristics under this first mode of operation. With no force applied to the actuating lever arm there will be no radial force on the rollers or on the collet if there is slight clearance between them when the spring is relaxed, so that there is only bearing friction coupling the collet to the drum, as shown in area D7. When force is applied to the actuating lever arm in a direction to tighten the spring on the rollers, as shown at E7, a radial force is created acting to press on the collet, thereby urging it into frictional engagement with the major diameter of the drum.

If the helical spring is made of only a few turns, of the order of three or four, all coils will tighten substantially uniformly when tightening force is applied to the actuating lever. Frictional engagement between the collet and drum will then be almost instantaneous.

If the helical spring is made of a large number of turns, of the order of 20 to 40, the transmitted torque will first rise sharply to a relatively small amount, then gradually increase as tension in the helical spring equalizes, as shown in area F7. After a number of revolutions of the collet maximum transmitted torque will be produced, as shown in area G7. The overall torque characteristics will vary in magnitude in approximate proportion with the actuating force, as illustrated by the curves of full-actuating torque and half-actuating torque.

In a second mode of operation, the direction of rotation is reversed so that the arbor is turning in a direction to rotate the actuator end of the helical spring in a direction to tighten it. When the helical spring comprises a large number of turns and the actuator arm urged in a direction to tighten the helical spring on the rollers, the rollers act on the helical spring to progressively tighten it so that the helical spring, in the extreme case, will be damaged or destroyed. If the helical spring is made of only a few turns, this self-tightening action will occur but to a lesser, self-limiting extent, to effectively cooperate with the actuating mechanism.

Operating characteristics of a third mode of operation are shown in FIG. 8 wherein the drum is the driving member, the collet is locked from rotating, the drum is rotated in either direction and the helical spring has a relatively large number of turns.

Area D8 represents the unloaded bearing friction. The actuating mechanism is energized at E8. The transmitted torque will then rise to and remain at a fixed level, approximately equal to the transmitted torque immediately after actuation of said first mode of operation. The transmitted torque in this third mode of operation will not build up thereafter because the rollers are not rotating. Therefore, the coils of the helical spring will not have their tensions equalized and the transmitted torque will result only from the few coils that are in tension.

A fourth mode of operation is shown in FIG. 9 wherein the drum is the driving member and the collet the driven member. A rotatable load is connected to the collet, said load having torsional resistance less than the transmitted torque capacity of the clutch immediately after the clutch is actuated. When the clutch is actuated at E9 the collet is stationary but will gradually begin to rotate. As the collet rotates the rollers will be rotated and the tension in the helical spring will gradually equalize, gradually increasing the transmitted torque. This increase in transmitted torque is a function of the number of rotations of the collet which has started at zero speed and gradually increased. Therefore, the rate of the increase in transmitted torque of this fourth mode of operation is less than that of said first mode. If for any reason the output shaft is frozen or overloaded so that it will not rotate, the torque will not build up from that value immediately after actuation and the clutch will transmit a relatively low, steady torque identical to that of said third mode, as shown in FIG. 8. This provides an additional overload safety feature.

The operating characteristics vary greatly, depending on the configuration of the helical spring. The effect of the direction of collet rotation on the spring action has already been described. Other variations in the spring structure include the cross section area of the spring wire, the number of turns and the fit between the helical spring and the collet.

The wire cross section area and number of turns will vary in an inverse relationship for given closed height of the spring. It is generally desirable to use as heavy a wire cross section as will allow the required number of turns in the available space for reasons of strength and ease of securing the spring ends.

The actuating force required to drive the actuating lever will decrease as the number of turns increases for the same maximum transmitted torque when operated in sad first and fourth mode of operation. In said third mode of operation, increasing the number of turns beyond approximately 5 to 10 turns has little effect on the operation because the additional turns are not effective unless the collet has rotated.

The helical spring may be made to have a clearance or tight fit on the rollers in its free state. With clearance therebetween, the clutch will release immediately when the actuating lever is returned to the nonactuating position whether the collet is rotating or stationary, so that the clutch may be disengaged when the driving members are stationary. When the helical spring has a tight fit on the rollers and has more than approximately 5 or 10 turns, the clutch will release when the collet rotates but will not release if the collet is stationary because the spring is held in its tensioned condition by friction with the rollers.

An oldham coupling means has been described for coupling the collet to the arbor, which is secured to the driving or driven shaft. It will be clear to those skilled in the art that there are many types of coupling such as a universal joint, bellows coupling, gear coupling or resilient coupling that would function equally well in place of the oldham coupling described.

Adjustable clamp 34, tightening screw 42, and an external pin or linkage (not shown) are employed for locking housing 22 against rotation. This permits rotative adjustment of said housing and associated spring end 8 which bias the operating position of the actuating lever. This adjustable feature allows initial orientation of clutch to a presumably fixed stroke range of the external solenoid or other actuating mechanism and provides for convenient in-service adjustments of the clutch.

Figure 5:
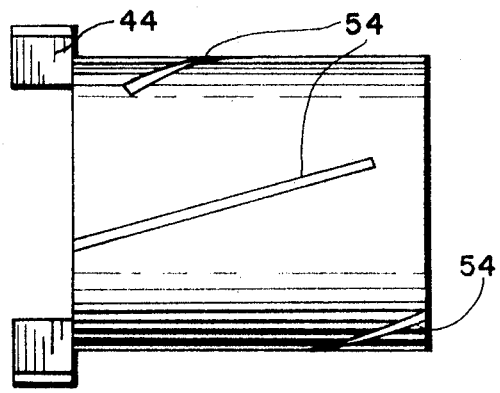
FIG. 5 is a side view of a modification of collet 14.

FIG. 5 is a side view of a modification to collet 14 in which four slits 54 are cut helically into the collet wall to permit radial flexing.

Many modifications of the design of the slit configuration of the collet are possible. Preferably, the collet would be made of hardened steel. This would require a slit or slits in the wall to allow it to contract and grasp the drum. The slits in the collet shown in FIG. 5 are skewed to allow the rollers to roll over the slits without bumping. The slit in the collet shown in FIG. 4 may be skewed or parallel with the tube axis, as shown.

It has been found experimentally that when long rollers are used there may be a tendency for the rollers to gradually skew with respect to the major axis. This causes the rollers to ride against their cage, causing friction loss and noisy operation. When required, a slight flat or groove (not shown in the drawing) is cut in the outside diameter of the collet, parallel to its axis, at least as long as the roller. This allows each roller to be free of radial pressure when it passes over the groove so that it can realign itself, thereby relieving the effects of the progressive skewing action.

Figure 6:
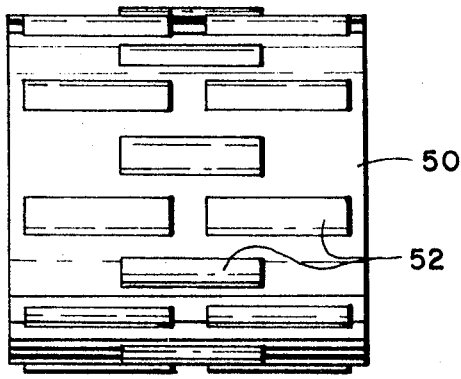
FIG. 6 is a side view of an alternate form of the rollers and their retaining cage.

An alternate type roller and roller cage arrangement that may be used with any of the devices is shown in FIG. 6. The rollers and cage assembly generally shown in the other figures consists of rollers extending substantially the entire length of the main outside diameter of the collet. The arrangement of short, staggered rollers 52 constrained against skewing and excessive end motion by cage 50 permits the use of shorter rollers while the overlap of the roller sets presents a generally continuous cylindrical envelope on which the helical spring bears. In order to provide smoother action with the helical spring it is preferable to slightly taper or otherwise relieve the ends of the rollers. It is clear that the rollers and cage used in this clutch are of a construction identical to that used for the roller and roller cage of ordinary roller bearings and that many of the various standard roller and cage arrangements in present day use are applicable for use in this clutch and the preferred type may be selected by those skilled in the art.

FIG. 10 is an alternate structure including multiple friction surfaces whose general operation will be the same as that described.

Stub shaft 82 is secured to end plate 80 by screws 84. End plate 80 is rotatably mounted on main shaft 56 and held axially by retaining ring 86. Collets 68 are connected to end plate 80 by flexible bellows 85. Collets 92 are connected to main shaft 56 by flexible bellows 94. Helical spring 76 surrounds rollers 72 in cage 74. Bent tang 64 on a first end of the helical spring is retained in a hole in rotatably mounted housing 60. Bent tang 66 on a second end of the helical spring is retained in actuator lever 78, rotatably mounted on end plate 80.

The general operation is the same as that of the preferred embodiment of my invention. Lug 88 on the housing clamp 62 is prevented from rotating by suitable means. An actuating mechanism acts on arm 90 of actuating lever 78 to rotate said actuating lever about the main clutch axis, causing the helical spring to contract about the rollers, creating inward, radial pressure to frictionally engage main shaft 56 and collets 92 with collets 68, thereby coupling the main shaft to the stub shaft. Release or reversal of the actuating mechanism loosens the grasp of the helical spring on the rollers, collets and main shaft, releasing the friction coupling between said stub shaft and main shaft. This alternate structure has the advantages of greater friction surface, greater transmitted torque and lower required actuating torque as compared with the clutch as shown in FIGS. 1 and 2.

While I have described and illustrated in this specification certain forms which my invention may take, it will be apparent to those skilled in the arts to which it relates that other embodiments, as well as modifications of those disclosed, may be made and practiced without departure from the spirit or scope of the invention, for the limits of which reference must be made to the appended claims.

What I claim is:

1. A clutch comprising at least two frictionally engageable means having at least one cylindrical engaging surface, rolling means comprising rollers surrounding said frictionally engageable means and means surrounding said rollers to act radially thereon, said means surrounding said rollers being not rotatively connected to either of said two frictionally engageable means.

2. A clutch as defined in claim 1 wherein at least one of said frictionally engageable means has a tubular portion which has at least one radially moveable portion.

3. A clutch as defined in claim 1 wherein the outermost said frictionally engageable means has a tubular portion with a recess in the outside diameter of said tubular portion parallel to the axis of said tubular portion, said recess being at least as long as said rolling means.

4. A clutch as described in claim 1 wherein said rolling means comprises a series of rollers retained in positional relationship with each other by a cage.

5. A clutch as defined in claim 1 wherein said rolling means comprises a series of rollers which extend substantially the full length of the said cylindrical engaging surface.

6. A clutch as defined in claim 1 wherein said rolling means comprises more than one row of rollers.

7. A clutch as defined in claim 1, including input and output members and connecting means coupling at least one of said frictionally engageable means to at least one of said members, said connecting means permitting limited radial expansion and contraction of said frictionally engageable means.

8. A clutch as defined in claim 1 wherein said means surrounding said rollers comprises a helical band.

9. A clutch as defined in claim 1 wherein said means surrounding said rollers comprises a helical band and releasable actuating means for tightening said band on said roller means.

10. A clutch as defined in claim 9 wherein said actuating means comprises arcuately adjustable means for helical compression actuating means.

11. A clutch comprising at least two frictionally engageable means, rollers surrounding said frictionally engageable means, helical compression means surrounding said rollers, a housing having one end of said helical compression means secured thereto, securing means preventing rotation of said housing and actuating means having the other end of said helical compression means secured thereto.

12. A clutch as described in claim 11 wherein said securing means comprises a stationary clamp adjustably secured to said housing.

13. A clutch comprising an arbor secured to one drive member, a drum secured to a second drive member, a collet surrounding said drum and frictionally engageable therewith, means connecting said collet to said arbor, rollers surrounding said collet, helical compression means surrounding the periphery of said rollers, a housing secured to one end of said helical spring, means preventing said housing from rotating and actuating means secured to the other end of said helical compression means.

14. A clutch comprising a first drive member, a second drive member, at least one substantially cylindrical, radially contractable first friction member connected to said first drive member by a first coupling means, at least one substantially cylindrical, contractable second friction member in interleaving relationship with at least one of said first friction members connected to said second drive member by a second coupling means, rollers surrounding the outermost said friction member and means disposed about said rollers for urging them radially inward.